June 20, 1950 W. T. HALL 2,512,324

PIPE CLEANING TAPE REEL

Filed May 29, 1948

INVENTOR.
WARD T. HALL
BY Bodell & Thompson
Attorneys

Patented June 20, 1950

2,512,324

UNITED STATES PATENT OFFICE 2,512,324

PIPE CLEANING TAPE REEL

Ward T. Hall, Hyattsville, Md., assignor to William H. Stewart, Syracuse, N. Y.

Application May 29, 1948, Serial No. 29,983

2 Claims. (Cl. 242—129)

This invention relates to conduit cleaning reels of the class having a reel member in the form of a cylindrical band on the inner side of which the tape, to be pushed through and manipulated in the conduit, is wound.

It has for its object the assembly of the cylindrical reel member and its frame by which the tape is held in place during the winding and unwinding, and the manipulation of the tape in the conduit.

The invention consists in the novel features and in the combinations and constructions hereinafter set forth and claimed.

In describing this invention, reference is had to the accompanying drawings in which like characters designate corresponding parts in all the views.

Figure 2:
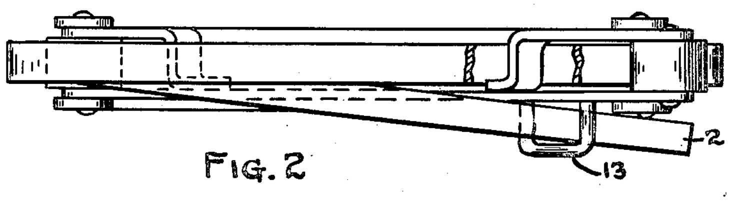
Figure 2 is a view looking downwardly in Figure 1 and partly broken away.
Figure 1:
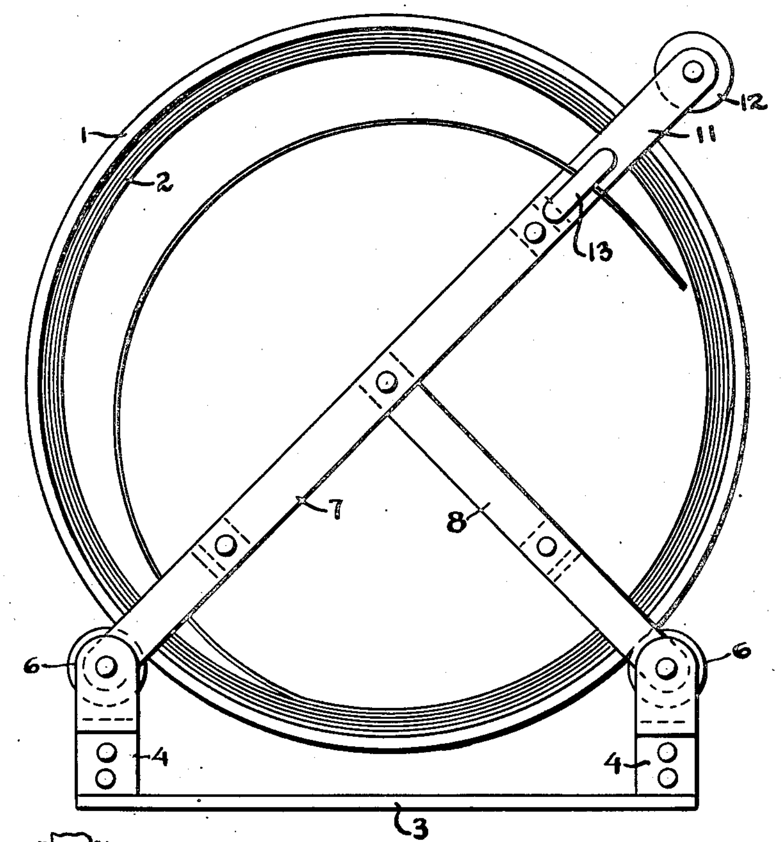
Figure 1 is an elevation of this conduit cleaning reel.
Figure 3:
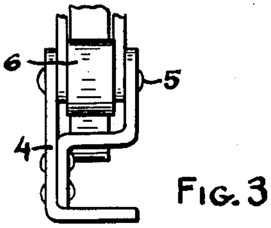
Figure 3 is a fragmentary end elevation of the base member looking to the left in Figure 1.

The reel comprises a revoluble reel member in the form of a cylindrical band in which the tape is wound, and a supporting frame therefor having guide openings for the tape located entirely on one side of a diameter of the reel so that one-half of the reel is unobstructed in order to be turned by hand to wind and unwind the tape, the guide openings loosely fitting the reel member and the tape wound therein. The guide openings are shown as located at the angles of a right angle triangle formation, and the openings are large enough so that the reel member can engage or run on the outer end edges of any two of the openings. Usually the outer end walls of the openings are provided with rollers coacting with the periphery of the reel member.

More specifically this reel comprises a cylindrical reel member 1 in which is wound, or coiled against the inner face thereof, a tape 2, and a frame consisting of a base 3 and a superstructure carried by the base and embracing the reel to hold it from displacement from the frame, but permit rotation thereof, and to guide and manipulate the end of the tape, or a head or tool at its outer end in the conduit to be cleaned. The tape 2 is suitably anchored at its outer end to the reel member 1 and having its inner end extending tangentially out of the reel at one side of the reel when being unwound to enter a conduit to be cleaned. The base 3 is provided with angular brackets 4 at its end. As shown, each bracket 4 is formed bifurcated and carries a spindle 5 on which a roller 6 is mounted, the reel 1 running on the rollers.

The superframe structure comprises a frame member 7 extending generally diametrically of the reel from one of the brackets 4, and a frame member 8 extending radially of the reel member 1 from the other bracket 4 at substantially a right angle to the diametrically extending member 7 and terminating at said member 7. Both members 7 and 8 are bifurcated at their ends adjacent the base 3 and the bifurcations are secured to the spindles 5 and provide guide openings through which the reel member 1 and the tape thereon extend, with the reel running on the rollers 6. The outer end of the frame member 7 is bifurcated at 11 and arranged astride the reel member 1 and the tape wound therein providing a guide opening through which the reel member and tape thereon can work. A roller 12 is mounted at the outer end of the diametrically extending frame member 7, and the distance between the roller 12 and the roller 6 at the inner end of the frame member 7 is greater than the diameter of the reel. The rollers 6, 6, are arranged at the opposite ends of the base of a right angle triangle formation, and the roller 12 at the apex of the triangular formation, so that during manipulation of the frame and the reel therein, the reel can roll either on the rollers 6 and be spaced from the roller 12, or can roll on one roller 6 and the roller 12. The rollers 6 and 12 constitute the outer edge walls of the guide openings. The guide openings are large enough to permit sufficient looseness or play of the reel member to let the reel member ride on any two of the rollers 6, 6, 12.

The frame member 7 is provided, near its outer end, with an eye 13 offset from the plane of the reel and to which the free end of the tape threads and is guided during winding and unwinding of the tape into and out of the reel.

Owing to the frame structure, the tape can be readily manipulated and twisted without dislodging from the reel, and also the reel is readily rotatable while the frame is being manipulated through different angular positions without dislocating the tape from the reel member.

What I claim is:

1. A pipe cleaning tape reel of the class described comprising a revoluble reel member in the form of a cylindrical band in which tape is wound, and a supporting frame therefore comprising an elongated member extending diametrically of the reel, and an elongated member at right angles to said first elongated member and connected to the latter adjacent the medial portion thereof, the free ends of said elongated members having forked parts to loosely embrace the reel, and means bridging the forked parts to support the reel for free rotation.

2. A pipe cleaning tape reel of the class described comprising a reel member in the form of a cylindrical band in which a tape is wound, and a frame comprising a base having spaced apart angular brackets, a diametrically extending frame member having openings at its ends through which opposite portions of the reel with the tape therein runs, said frame member being secured at one end to one of the brackets, and a second frame member extending radially of the reel member at a right angle to the first frame member and being secured at its inner end thereto and terminating at the first frame member and being secured at its outer end to the other bracket and having an opening through which the reel member with tape therein runs, the first frame member having an eye towards its outer end and offset from the plane of the reel member through which eye the inner end of the tape threads.

WARD T. HALL.

REFERENCES CITED

The following references are of record in the file of this patent:

UNITED STATES PATENTS

| Number | Name | Date |
|---|---|---|
| 736,825 | Cutter | Aug. 18, 1903 |
| 1,516,331 | Catlett et al. | Nov. 18, 1924 |
| 1,561,485 | Powers | Nov. 17, 1925 |
| 2,173,352 | Carson | Sept. 19, 1939 |
| 2,219,555 | Burwell | Oct. 29, 1940 |